O. E. HUNT.
MOTOR VEHICLE.
APPLICATION FILED SEPT. 15, 1913.

1,147,865.  Patented July 27, 1915.

Witnesses:
Clair J. Cote
LeRoi J. Williams

Inventor:
Ormond E. Hunt,
By Milton Tibbetts,
Attorney.

UNITED STATES PATENT OFFICE.

ORMOND E. HUNT, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,147,865.  Specification of Letters Patent.  Patented July 27, 1915.

Application filed September 15, 1913. Serial No. 789,810.

*To all whom it may concern:*

Be it known that I, ORMOND E. HUNT, a citizen of the United States, and resident of Detroit, Wayne county, State of Michigan, have invented certain new and useful Improvements in Motor-Vehicles, of which the following is a specification.

This invention relates to motor vehicles, and particularly to supporting means for the axle bumpers and limit straps.

The prime object of the invention is to provide a simple, effective and comparatively cheap support for the axle bumpers and limit straps of a motor vehicle.

Figure 1:
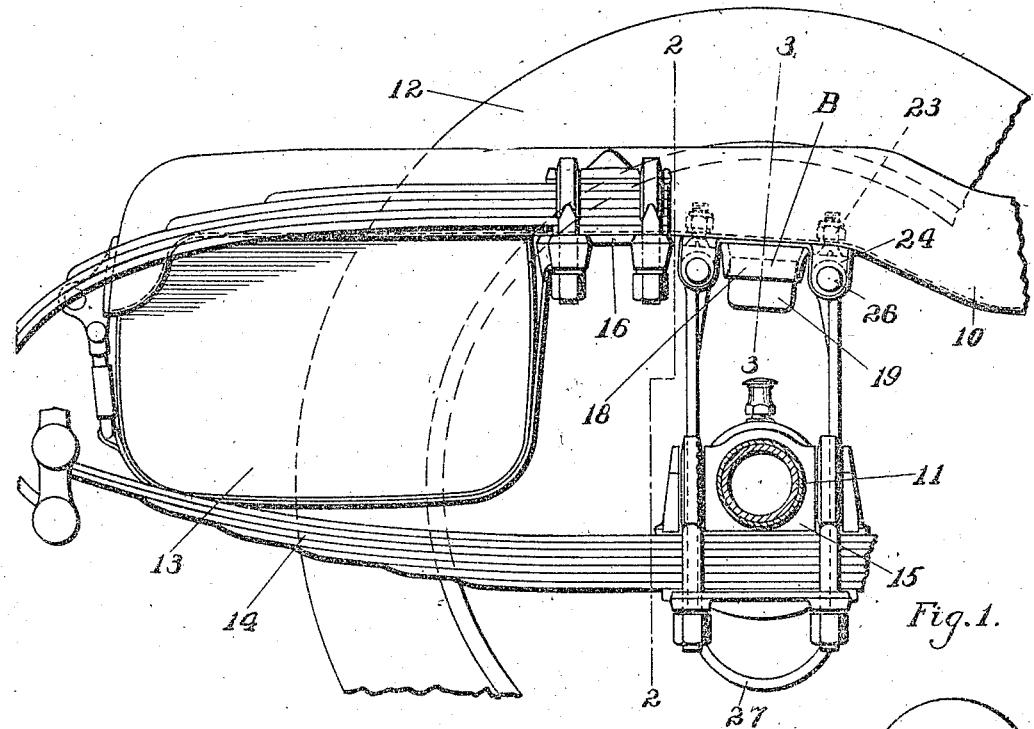
Figures 2, 3, 4:
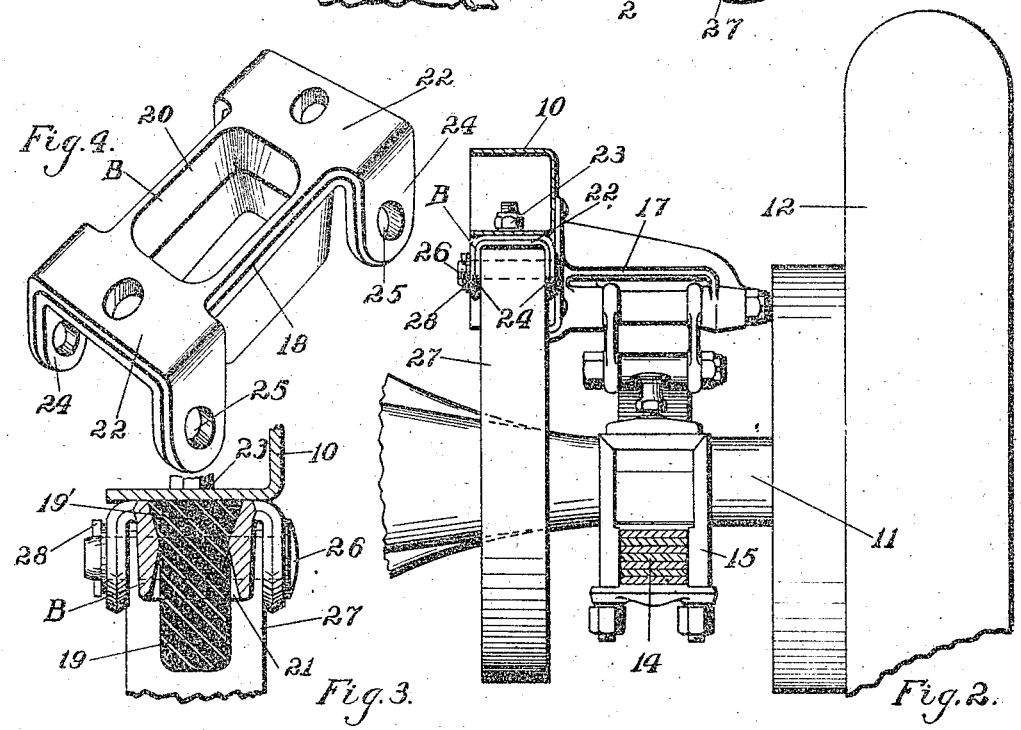

The invention will be described in connection with the drawings, which form a part of this specification, and in which, Figure 1 is a side elevation of the rear end of a vehicle embodying this invention, the right wheel being cut away to disclose the frame and adjacent parts; Fig. 2 is a rear view of the parts shown in Fig. 1; and is taken substantially on the line 2—2 of Fig. 1; Fig. 3 is a transverse section on the line 3—3 of Fig. 1; and Fig. 4 is a perspective view of a bracket constructed in accordance with this invention.

Referring to the drawings, the rear end of a motor vehicle frame is indicated at 10, and the rear axle at 11, wheels 12 being mounted at the ends of the axle. The drawings also show a gasolene tank 13 suspended at the extreme rear end of the frame, and springs 14 of three-quarter elliptic form, which support the frame flexibly upon the axle. The axle spring bracket is shown at 15, the rear frame bracket for the spring is shown at 16, and the forward spring bracket is shown on the frame in Figs. 2 at 17. It will be understood that as the vehicle passes over unevenness in the road surfaces, the springs 14 are compressed and the axle 11 and frame 10 move toward and from each other. To relieve the springs of excessive strains and to prevent the metal of the frame from coming in direct contact with the axle, most vehicles are provided with limit straps and rubber bumpers of one sort or another. The present invention involves the use of a specially designed bracket for the dual purpose of supporting such a rubber axle bumper and such limit straps.

The bracket B is formed with a central portion 18 which is formed with a through cavity, preferably of rectangular cross section, which cavity is shown as being tapered in cross section from its ends toward its middle. Thus, when the bracket is secured against the underside of the frame as shown in the drawings, the inner end of this cavity is closed by the frame, and the rubber bumper 19, which is shown as having a somewhat enlarged inner end 19', is very securely held in the bracket without the necessity for passing any bolts or other fastening devices through any part of the bumper itself. In this connection it will be understood that the rubber bumper is placed in the bracket before the latter is secured in the frame, being forced through the central portion 18 from the inner opening 20 of the cavity toward the outer opening 21 thereof. It will also be observed that, by reason of the tapered form of the cavity, there is a tapering space between the bumper and the outer end of the cavity which permits the bumper to expand somewhat under pressure from its lower end and thus the rubber is supported for a considerable distance along its sides. The bracket B also has end flanges 22 by which the bracket is secured to the frame, as by bolts 23. Limit strap supporting means are formed as a part of these flanges 22, which means are in the form of separated downwardly extending ears 24, having holes 25 to receive bolts 26. The bolts 26 are adapted to pass through loops in the ends of the limit straps 27, and the bolts are held in place by cotter pins 28, or similar devices. The limit straps 27 pass downwardly around the axle 11 and limit the relative separating motion of the axle and frame.

As regards the bracket B, aside from the advantages above described as to its uses in service, in the form shown it is particularly easy, and therefore inexpensive, to manufacture, since the entire bracket may be drop forged with the ears 24 flattened out in a plane with the flanges 22 and later bent to the form shown in the drawings. After this operation of forging the bracket and bending the ears, the bracket is complete except for the drilling of the six holes shown, the double tapered cavity being formed in the square central portion as the bracket is forged.

Having thus described my invention, what

I claim and desire to secure by Letters Patent is:

1. The combination of a rubber bumper and a support therefor comprising a part arranged at one side of and out of contact with the bumper and adapted to support the bumper when depressed.

2. A rubber bumper support formed with a cavity tapering in cross section from its ends toward its middle.

3. In a motor vehicle, a bracket comprising a central part having a cavity tapering in cross section from its ends toward its middle to support a rubber bumper, and end flanges having means for attachment to the vehicle frame and having spaced ears to support limit straps.

4. In a motor vehicle, the combination with the frame and the axle, of a bracket having a central part with a through cavity, means to secure the bracket against the underside of the frame to thereby close the inner end of the cavity, a rubber bumper in said cavity and extending through its outer end to contact with the axle, downwardly extending spaced ears at each end of the bracket, a limit strap extending around the axle and having bolts to secure its ends to said ears, substantially as described.

In testimony whereof I affix my signature in the presence of two witnesses.

ORMOND E. HUNT.

Witnesses:
C. S. FREEMAN,
F. H. TREGO.